United States Patent [19]

Toth

[11] 4,443,687
[45] Apr. 17, 1984

[54] METHOD AND SYSTEM FOR AUTOMATICALLY TERMINATING A MIG WELDING OPERATION

[75] Inventor: Tibor E. Toth, Florence, S.C.
[73] Assignee: Union Carbide Corporation, Danbury, Conn.
[21] Appl. No.: 348,347
[22] Filed: Feb. 12, 1982
[51] Int. Cl.$^3$ .............................................. B23K 9/10
[52] U.S. Cl. ........................ 219/130.21; 219/130.31
[58] Field of Search ................. 219/137.71, 130.21, 219/130.5, 130.31

[56] References Cited

U.S. PATENT DOCUMENTS

| | | | |
|---|---|---|---|
| 2,897,343 | 7/1959 | Regnauld et al. | 219/130.5 |
| 3,501,614 | 3/1970 | Allen | 219/130.21 |
| 3,564,196 | 2/1971 | Needham et al. | 219/130.31 |

Primary Examiner—C. C. Shaw
Attorney, Agent, or Firm—Eugene Lieberstein

[57] ABSTRACT

A method and control circuit for terminating a consumable electrode electric arc welding operation which comprises monitoring the welding parameters of the wire drive motor speed and the arc working voltage, comparing the monitored levels with a multiple number of present combinations of both arc working voltage and motor speed with at least one preset combination defining a high arc working voltage representing a long arc condition and with the last preset combination including a motor speed of relatively close to zero; evaluating each preset combination in tandum to determine if the conditions of a preset combination are satisfied and interrupting the power supplied to the arc in response to the satisfied combination of preset conditions.

3 Claims, 2 Drawing Figures

METHOD AND SYSTEM FOR AUTOMATICALLY TERMINATING A MIG WELDING OPERATION

This invention relates to continuously fed consumable wire electrode electric arc welding and more particularly to an improved method and control for preventing electrode stick out and burn back at the completion of a welding operation.

An adjustable time delay relay is presently used in the welding industry for terminating the arc at the completion of a weld. The time delay relay provides a manually adjustable time delay between deenergization of the wire feed motor and the removal of power supply arc voltage. Should the power supply be turned off concurrently with the deenergization of the wire feed control, the electrode wire would continue advancing into the weld puddle due to the remaining inertia of the wire feed motor. This would inevitably result in electrode sticking and possibly freezing of the electrode in the weld puddle as the puddle solidifies. If, on the other hand, the power supply is left on to sustain the arc for too long a time period after the wire feed control is deenergized, the wire electrode will burn back and fuse to the guide tube. Therefore the time delay relay must be adjusted to sustain the arc for a limited time which is just long enough to prevent electrode sticking but short enough to prevent burn back. The time delay relay adjustment is an empirical evaluation requiring a trial and error procedure. Each time the welding conditions or parameters are changed or the welding wire size is varied the time delay relay must be readjusted. The appropriate setting is determined by the welding operation employed, the size of the welding wire, the wire feed rate and the welding current. Accordingly, the use of a time delay relay is time consuming, unwieldy and limited solely to manual welding with a human operator.

Prior atempts to automate termination of the arc to avoid electrode sticking and burn back have had only limited success. One technique which was successful for a given welding operation within a very narrow size range of electrode wire is described in U.S. Pat. No. 3,501,614 issued on Mar. 17, 1970, the disclosure of which is herein incorporated by reference. The gist of the patent teaching was to measure the back emf of a constant field DC type wire feed motor and to extinguish the arc when the back emf dropped to a predetermined level corresponding to a predetermined drop-out speed. This is based on the principle that the back emf of a constant field DC type motor corresponds to motor speed. This system, however, failed to accommodate for changes in arc welding conditions such as from short to spray arc or for variations in welding wire size over any reasonable range of wire diameter sizes. Accordingly, it is the primary object of this invention to provide for a method and control for automatically preventing electrode stick out and burn back at the completion of a welding operation independent of welding condition or wire size changes.

Other objects and advantages of the present invention will become apparent from the following detailed description of the invention when read in conjunction with the accompanying drawings of which:

Figure 1:
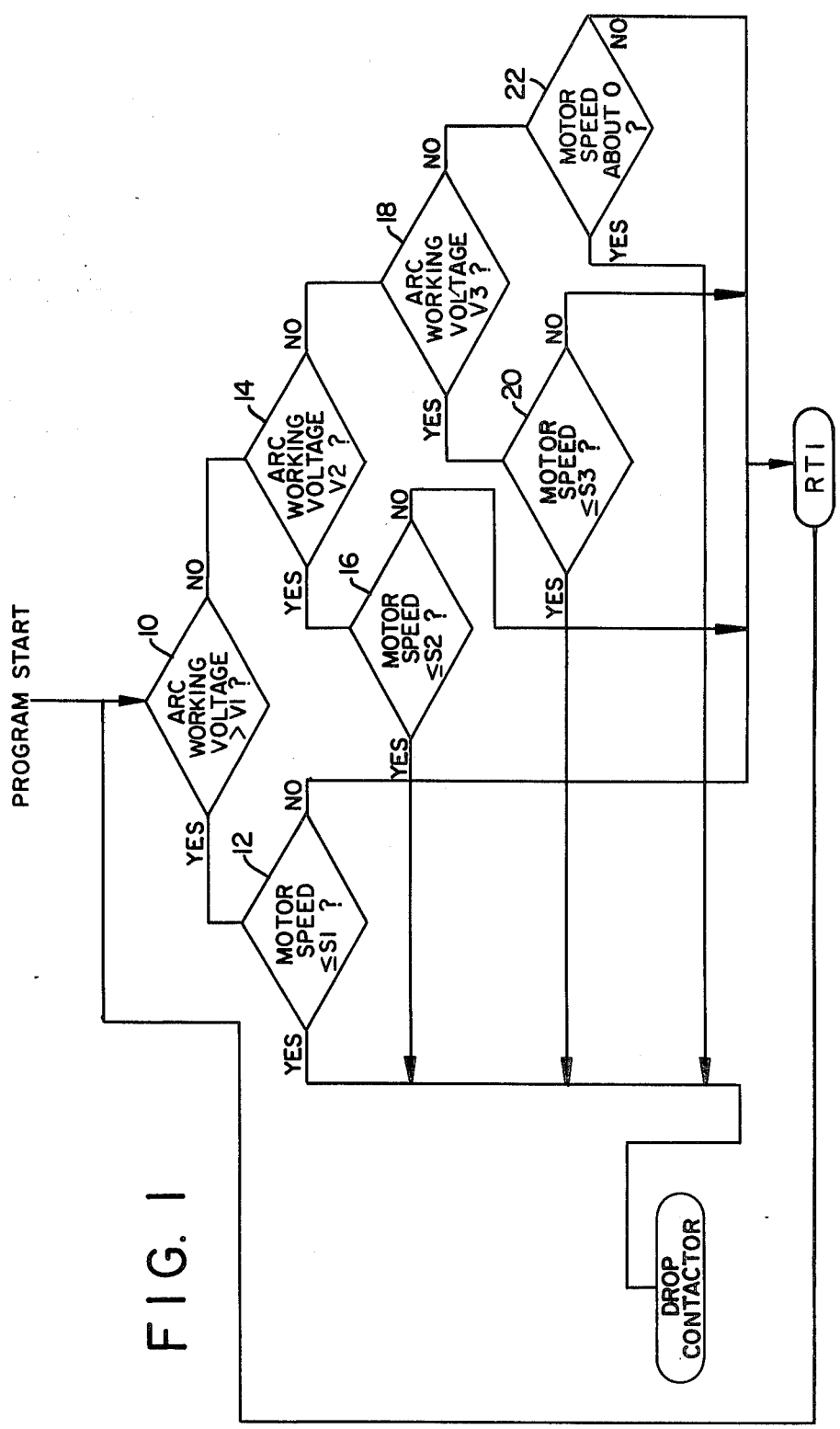
FIG. 1 is a flow chart of the method and control of the present invention.

FIG. 1 is a flow chart of the method and control of the present invention. It should be understood that any conventional microprocessor may readily be programmed to perform the program functions identified in the flow chart of FIG. 1. Alternatively, the method and control of the present invention may be practiced using a hard wired electric circuit as illustratively embodied in the circuit schematic of FIG. 2.

The method of the present invention follows the flow chart of FIG. 1 with the program start being initiated upon termination of the arc welding operation. The typical continuously fed consumable electrode arc welding operation is started and stopped by a respective start and stop signal which may be generated either from the operation of a standard toggle switch for performing a manual arc welding operation of from a remote electronic signal such as in a semi-automatic or automatic arc welding operation. The start and stop command signal is used to enable and disable the electrode wire feed drive motor (not shown) in the conventional manner and to enable and disable a welding contactor for energizing and deenergizing the welding power supply (not shown). The electrode wire feed drive motor is a conventional constant field DC or permanent magnet motor which is used to continuously drive a consumable wire electrode toward the workpiece to be welded in a manner conventional to the practice of MIG welding. The welding power supply (not shown) generates the required arc voltage between the electrode and workpiece. Termination of the arc welding operation is accomplished by generating the stop command signal in response, for example, to the release of the toggle switch. The stop command signal disables the wire feed motor by conventional means, such as by application of a dynamic brake as is well known in the art. The wire feed drive motor slows to a stop over a period of time depending upon the motor operating speed at the instant of termination and the motor inertia. The stop command signal also de-energizes the welding contactor which interrupts the welding power supply in response to the control method of the present invention.

In accordance with the method of the present invention the specific parameters of both motor speed and arc working voltage are monitored simultaneously. The arc working voltage can be monitored during arc welding with the detected value stored in memory when a programmed microcomputer is used for carrying out the method of the invention or alternatively the arc working voltage can be monitored by the operator. In the latter case the operator can preset a reference source of potential representing the monitored arc working voltage. The monitored values of arc voltage and speed are measured against a predetermined multiple set of arc working conditions of voltage and speed in a predetermined sequence with the last combination of conditions representing a minimum motor speed of relatively close to zero. For purposes of the present invention this minimum speed can be between 0 and 15 inches per minute.

The flow chart of FIG. 1 illustrates four sets of arc working voltage and speed combinations for carrying out the method of the present invention. The four sets of conditions are arranged to be interrogated in tandum. The first set is represented by blocks 10 and 12. Block 10 defines an arc working voltage of $V_1$, where $V_1$ may represent a voltage range of e.g. 32 volts to 100 volts or simply an inquiry of a voltage greater than the lower limit of the range, i.e., above 32 volts and where block 12 defines a predetermined motor speed S1 of e.g. 100 inches per minute. Accordingly, when the monitored arc working voltage is detected to be above V1 and the motor speed at S1 the welding contactor will be disabled and the welding power supply de-energized. The program routine is arranged to continue the inquiry of the motor speed condition until the motor speed drops to a level equal to or less than S1.

The second set of arc working voltage and speed conditions is identified by blocks 14 and 16 in combination. Block 14 defines an arc working voltage V2 representing a voltage range of between a predetermined level of e.g. 28 volts and the lower level of voltage V1 i.e. over 28 but less than V1. Block 16 defines a predetermined motor speed of S2 of e.g. 80 inches per minute. Accordingly, when the monitored arc working voltage is detected to be at V2 with the motor speed at S2 the welding contactor will be disabled and the welding power supply de-energized. With the arc working voltage at V2 the motor speed inquiry continues until the motor speed drops to a level equal to or less than S2.

The third set of arc working voltage and speed conditions is identified by blocks 18 and 20 in combination. Block 18 defines an arc working voltage V3 representing a range of between a predetermined level of e.g. 24 volts and the lower level of the voltage range V2 i.e. over 24 volts but less than V2. Block 20 defines a predetermined motor speed of S3 of e.g. 60 inches per minute. Accordingly, when the monitored arc working voltage is detected to be V3 with the motor speed at S3 the welding contactor will be disabled and the welding power supply de-energized. With the arc working voltage at V3 the motor speed inquiry continues until the motor speed drops to a level equal to or less than S3.

The last set of arc working voltage and speed conditions as used in the program flow chart of FIG. 1 is a fourth set including block 18 of the third set and block 22. However, Block 22 operates in conjunction with a negative response to the inquiry in block 18 i.e. when the arc working voltage is below V3. Block 22 defines a minumum motor speed of relatively close to zero, i.e., within a range of preferably between 0 to 15 inches per minute. Accordingly, when the monitored arc working voltage is detected to be below V3 the motor speed will be permitted to drop to the minumum speed before dropping out the welding contactor.

It should be apparent that although four sets of arc working voltage and speed conditions are illustrated the present invention requires only a minimum of at least two sets of arc working voltage and speed condition but preferably at least four or more sets. The last set of conditions must include, in combination with a minimum arc working voltage, a motor speed of relatively close to zero inches per minute i.e. between zero and fifteen inches per minute. Each set of conditions may be empirically established starting from a first set which should represent the highest arc working voltage that can be used with the system i.e. corresponding to the longest arc with each succeeding set of conditions representing operating conditions of voltage and speed between the longest arc and the shortest arc with the last set including operation at the lowest arc working voltage and a motor speed condition of relatively close to zero.

The program routine followed in the flow chart of FIG. 1 interrogates each set of conditions in a tandum fashion. In the first set inquiry is made of the arc working voltage in block 10 to determine if it is above V1. If the inquiry is positive block 12 is interrogated to determine if the motor speed is less or equal to S1. A negative response results in a return through interrupt to the program start condition for successive reiterations of the same set of inquiries until both conditions are satisfied.

If the inquiry in block 10 is negative, the second set of conditions represented by blocks 14 and 16 is interrogated. Inquiry is made of the second set in similar fashion until both conditions are satisfied or until the inquiry in block 14 provides a negative response at which time the third set of conditions is interrogated. This routine is followed in accordance with the method of the present invention in succession for each set of conditions with a total number of N sets where N represents any whole number. The last set of conditions must include an inquiry of a minimum motor speed of relatively close to zero. Once a set of conditions is satisfied the welding contactor is disabled and the welding power supply interrupted.

Figure 2:
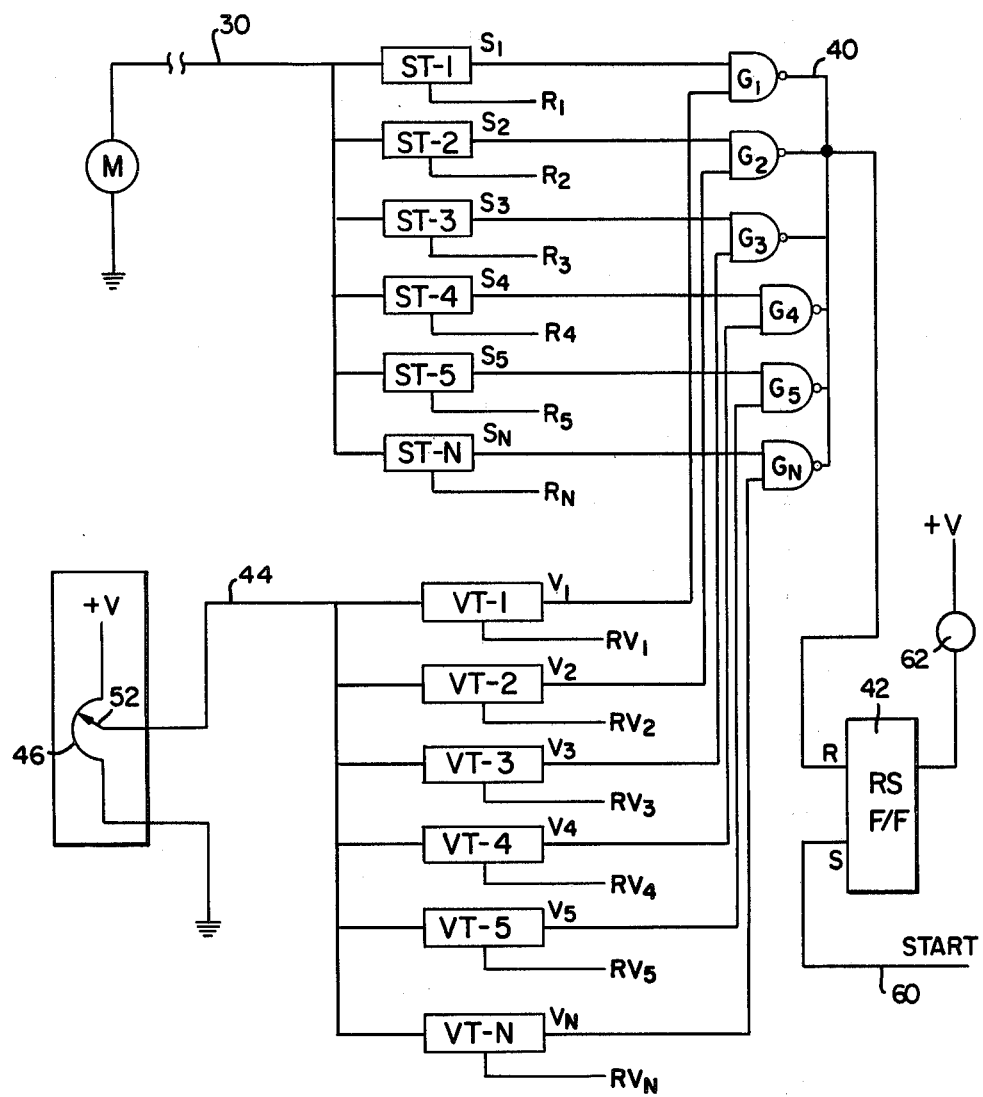
FIG. 2 is a schematic circuit diagram of an illustrative example of a welding control for practicing the present invention.

A hard wired electronic control for practicing the method of the present invention is shown in FIG. 2. An input signal 30 is generated in response to the back emf across the wire feed drive motor M or in response to a speed count of output pulses from a tachometer coupled directly to the motor. The latter arrangement for deriving an electrical signal responsive to motor speed is well known in the art and is quite conventional. In either case an input signal 30 corresponding to motor speed is applied in common to each of a multiple number of conventional level detectors identified as ST-1 through ST-N. Each detector has a second adjustable reference input R1 through RN respectively. The reference inputs R1 through RN are adjusted to provide detector outputs S1 through SN which will be at logical low levels except when the reference input equals the input signal 30 at which time the detector output will go high. Accordingly, the detector outputs S1 through SN will provide successive high signals at predetermined speed levels corresponding the reference levels R1 through RN. The output SN should be high for the minimum speed set by RN representing a speed of relatively close to 0 inches per minute.

The detector outputs S1 through SN are connected as inputs to a corresponding multiple number of Nand gates G1 through GN. The output of each Nand gate is tied in common and applied as the output signal 40 to the RS flip-flop 42. The RS flip-flop 42 is a conventional flip-flop which latches its output on a reset pulse and remains in such state until it is set. Each Nand gate receives a second input V1 through VN from a multiple number of voltage detectors VT-1 through VT-N. The voltage detectors VT-1 through VT-N are conventional range or window detectors each responsive to a common input 44 from an adjustable potentiometer 46 having a variable wiper arm 52. The wiper arm 52 is preset by the operator for a given arc working voltage. The reference voltage RV1 through RVN are predetermined voltage inputs to cause each of the voltage detectors VT-1 through VT-N to detect a predetermined voltage range. The range of voltage detection is also adjustable through an internal adjustment of each voltage detector as is well known in the art. Accordingly, the voltage detectors VT-1 is adjusted to detect a voltage range of between e.g. 32 volts and a level which for practical purposes means a voltage above 32 volts. The voltage detector VT-2 is adjusted to detect a voltage range of, for example, between 28 to 32 volts with the voltage range for the voltage detectors VT-3 etc. to VT-N representing decreasing voltage ranges of, for example, 24 to 28 volts; 20 to 24 volts; 18 to 20 volts and 0 to 18 volts, i.e. below 18 volts. The last voltage range is adjusted to represent a minimum arc working voltage condition for use in combination with the last level detector ST-N.

In operation, the adjustable potentiometer 46 is preset by the operator for a given arc working voltage condition. The termination of the arc welding operation is initiated in the conventional manner so as to cause the wire feed drive motor M to be disabled. A start signal 60 should also be generated to assure resetting of the RS flip-flop 42. For any given arc welding voltage condition as preset in potentiometer 46 there will exist a corresponding voltage range as defined by the preset ranges for the voltage detectors VT-1 through VT-N in which such arc welding voltage condition lies. The corresponding voltage detector will provide a logical high out. If the wiper arm 52 is set for an arc working voltage of above 32 volts the output signal V1 will be high. As soon as the motor speed drops to the preset speed level S1 of e.g. 100 inches per minute the Nand gate G1 provides an output to set RS flip-flop 42. The RS flip-flop 42 operates the welding contactor control 62 to disengage the welding contactor (not shown). The welding contactor control 62 may simply represent a relay coil. If the arc working voltage were set at 26 volts the output V3 would be high. In such case only the Nand gate G3 could be enabled when the motor speed drops to the speed level S3 of e.g. 60 inches per minute. If the arc voltage were set below a minimum value representing a short arc condition the voltage output VN would be high. When the output SN is also high the RS flip-flop 42 would set to disengage the welding contactor for interrupting the welding power supply. The output SN represents a motor speed of relatively close to zero i.e. between 0 and 15 inches per minute.

It should be obvious that other circuit arrangements may be used to practice the method of the present invention as hereinafter claimed. The preferred arrangement is to use a microcomputer programmed to follow the flow chart of FIG. 1 with the arc working voltage level monitored and stored in memory.

I claim:

1. A method for automatically controlling the sequence of termination of a consumable electrode electric arc welding operation in which the consumable electrode is driven toward a workpiece to be welded by a wire feed drive motor under any given set of arc working conditions of wire feed rate, electrode size and arc working voltage with the arc working voltage generated from a welding power supply comprising the steps of :
   establishing a finite minimum number of at least two preset combinations of arc working conditions including at least an arc working voltage and/or a motor speed with the first of said preset combination of conditions defining a relatively high arc working voltage and a relatively high wire feed speed and with the last of said preset combination of conditions defining a motor speed equal to relatively close to zero inches per minute;
   deenergizing the electrode wire feed drive motor;
   monitoring the arc working voltage and motor speed following said deenergization;
   comparing in a predetermined sequence said monitored arc working voltage with the arc working voltage in each preset combination to determine if the monitored arc working voltage will satisfy the arc working voltage condition of any preset combination;
   selecting the preset combination satisfying the arc working voltage condition;
   comparing the monitored motor speed with the motor speed in said selected preset combination;
   interrupting the welding power supply when the monitored motor speed equals the motor speed within the selected preset combination; and
   when the monitored arc working voltage fails to satisfy the arc working voltage condition of any of the preset combinations then interrupting the welding power supply when the monitored motor speed reaches a predetermined minimum level representing the last preset condition.

2. A method as defined in claim 1 wherein the preset conditions between said first and said last preset combination represent sets of arc working voltage and motor operating speed conditions in a predetermined decreasing succession.

3. A control system for automatically controlling the sequence of termination of a consumable electrode electric arc welding operation in which the consumable electrode is driven toward a workpiece to be welded by a wire feed drive motor under any given set of conditions of wire feed rate, electrode size and arc working voltage with the arc working voltage being generated from a welding power supply in circuit with the consumable electrode and workpiece, comprising:
   means for deenergizing the wire feed drive motor;
   a first plurality of detection means responsive to said speed monitoring means and to a first plurality of reference signals for generating a first set of output signals corresponding in succession to a predetermined number of motor speeds;
   means for monitoring the arc working voltage developed by said welding power supply;
   means for presetting a reference source of potential representing the monitored arc working voltage;
   a second plurality of detection means responsive to the magnitude of the preset reference source of potential and to a second plurality of reference signals for generating a second set of output signals corresponding in succession to a predetermined number of arc working voltage ranges;
   a plurality of gating means each responsive to an output signal from said first set of output signals and to an output signal from said second set of output signals in a predetermined combination; and
   means responsive to the output of said gating means for interrupting the welding power supply.

* * * * *